Figure 3:
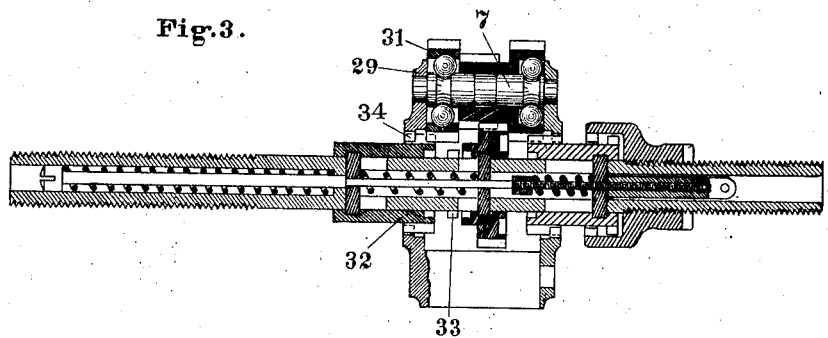

F. WINKLER.
FOUR-SPEED PLANET GEARING.
APPLICATION FILED APR. 23, 1912
1,058,510.
Patented Apr. 8, 1913
4 SHEETS—SHEET 1.
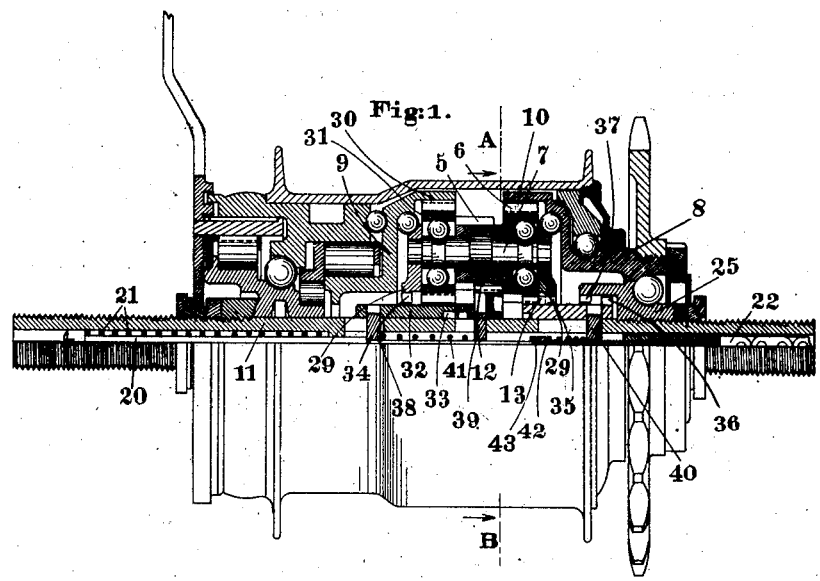
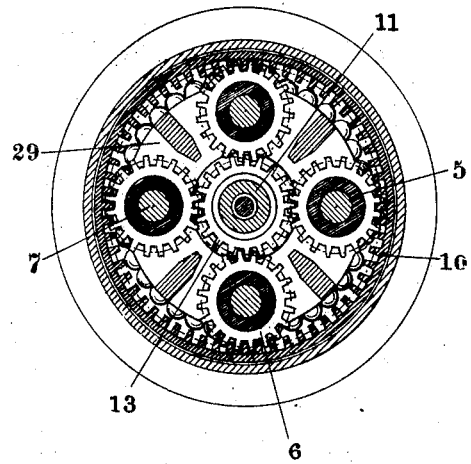
Witnesses
Inventor

F. WINKLER.
FOUR-SPEED PLANET GEARING.
APPLICATION FILED APR. 23, 1912.

1,058,510.

Patented Apr. 8, 1913.

4 SHEETS—SHEET 2.

Witnesses

W. Wallace Nairn Jr.
Rosina T. Finotti

Inventor

Franz Winkler
By Julian C. Dowell
his attorney

F. WINKLER.
FOUR-SPEED PLANET GEARING.
APPLICATION FILED APR. 23, 1912.

1,058,510.

Patented Apr. 8, 1913.

4 SHEETS—SHEET 3.

Witnesses

Inventor

F. WINKLER.
FOUR-SPEED PLANET GEARING.
APPLICATION FILED APR. 23, 1912.

1,058,510.

Patented Apr. 8, 1913.

4 SHEETS—SHEET 4.

Witnesses

Inventor

UNITED STATES PATENT OFFICE.

FRANZ WINKLER, OF SCHWEINFURT, GERMANY, ASSIGNOR TO SCHWEINFURTER PRÄCISIONS-KUGEL-LAGER-WERKE FICHTEL & SACHS, A FIRM COMPOSED OF ERNST SACHS AND HEDWIG FICHTEL, OF SCHWEINFURT, GERMANY.

FOUR-SPEED PLANET-GEARING.

1,058,510.      Specification of Letters Patent.      Patented Apr. 8, 1913.

Application filed April 23, 1912. Serial No. 692,547.

*To all whom it may concern:*

Be it known that I, FRANZ WINKLER, a subject of the King of Bavaria, residing at No. 23 Rossbrunnstrasse, Schweinfurt, in Germany, have invented a new and useful Four-Speed Planet-Gearing, of which the following is a specification.

This invention has reference to a planet gearing capable of producing four different speeds, while the adjustment of the mechanism for its variable operation is obtained by the axial displacement of a single member which controls the various elements thereof.

The objects aimed at with the invention are to produce the said effects by the use of the least possible number of parts in the device and by simple and slight movements of the controlling elements.

A further object of the invention is the reduction of friction in the gearing by excluding axial pressure upon the rotating parts of the appliance and by establishing a rigid or solid connection between all gear wheels in the middle speed which is the normal drive.

These objects are attained by the use of only three sets of planet gearing so arranged and united that the planet wheels or pinions of all of them are supported on a common planet carrier which is freely rotatable, while the connection with driving and driven members is obtained by means of internal toothed rims provided on the said members and meshing with the outer ones of the three sets of planet gearing, all planet pinions being permanently in engagement with separate sun wheels, which are adapted to be coupled in different combinations or released, when the corresponding gearing is to run idle. Locking of the said sun wheels is effected by shifting adjusting means in axial direction, whereby resilient connecting means may be interposed between the controlling member and the sun wheels in various ways, in order to allow the coupling of the sun wheels with fixed or rotatable means step by step as required for obtaining the desired speed. Two of the sets of planet gearing are united by their planet pinions being rigidly connected with one another.

In the accompanying drawings which form a part of this specification two constructional forms of the said planet gearing are illustrated, clearly representing the invention and its essential features.

Figure 4:
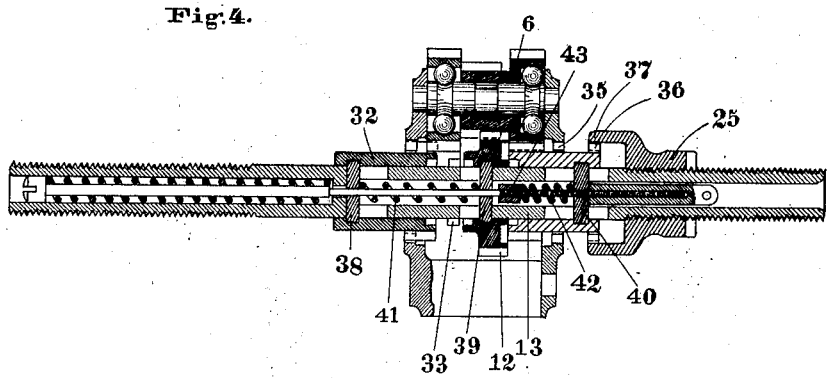
Figure 5:
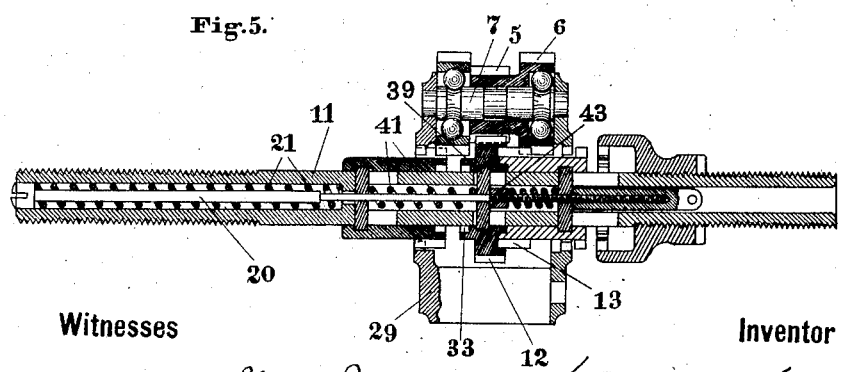
Figure 6:
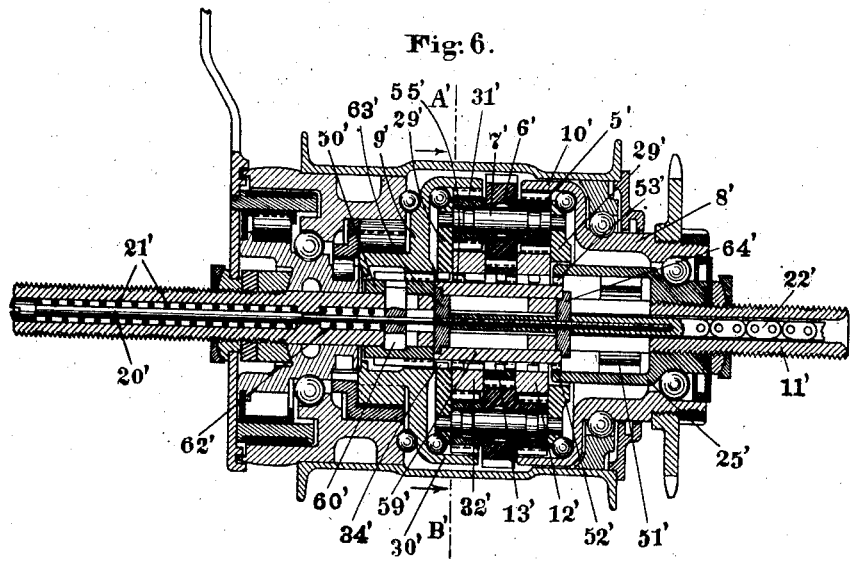
Figure 7:
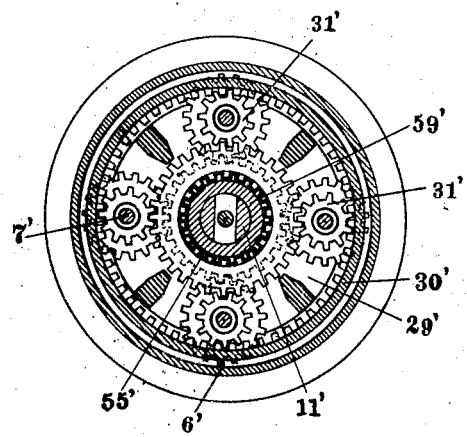
Figure 8:
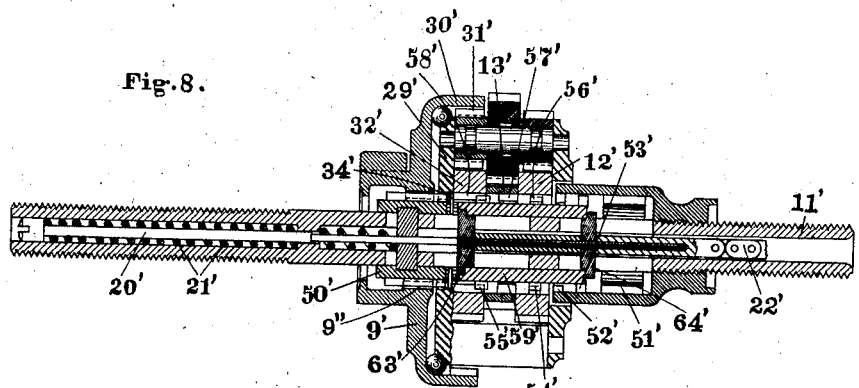
Figure 9:
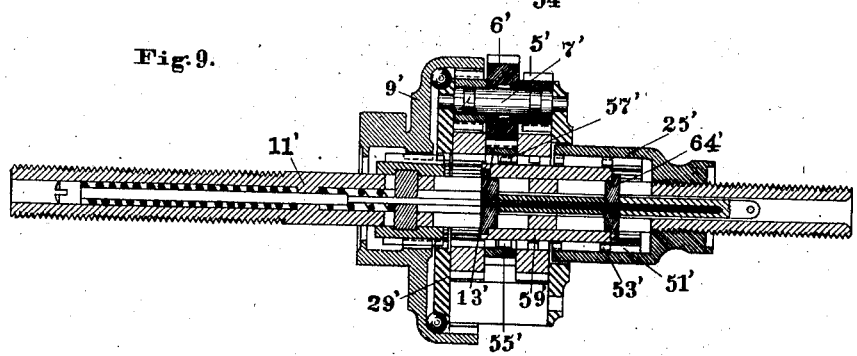
Figure 10:
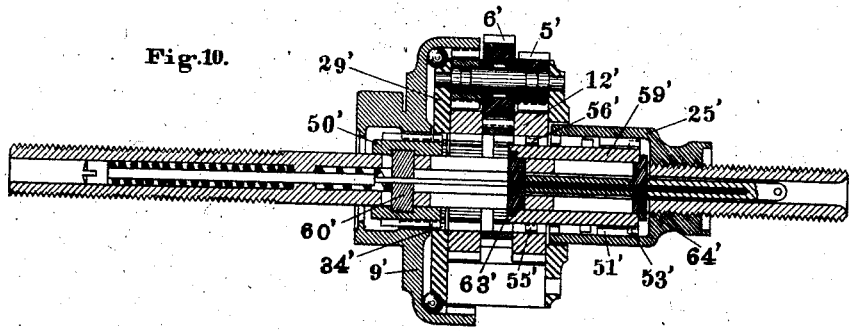

Figure 1 represents a longitudinal section of the planet gearing as combined with a coaster brake of a cycle-hub; Fig. 2 is a cross-section of the gearing, taken on the line A—B of Fig. 1; Figs. 3 to 5 illustrate a longitudinal section of the main parts of the gearing with different positions of the controlling means, other parts being not shown for the sake of clearness; Fig. 6 is a longitudinal section of a second constructional form of the gearing; Fig. 7 is a cross section taken on the line A'—D' of Fig. 6; Figs. 8 to 10 represent different positions of the operative parts of the controlling device.

Similar numerals or reference characters denote similar parts throughout all figures of the drawings.

Referring to the construction illustrated in Figs. 1 to 5, the driving member 8 is provided with an internal toothed wheel 10, which permanently meshes with the larger pinions 6 of two sets of planet wheels 5 and 6 integral or rigidly connected with one another. A similar wheel 30 is formed on the driven member 9 and gears with the planet pinions 31 which rotate on the same pins or pivots 7 as the pinions 5, 6, these pins being suitably fixed at their ends in a planet-wheel carrier 29. Ball bearings are used for supporting the various pinions. Corresponding to the various sets of planet wheels there are slidably mounted on the axle 11 three different sun wheels, the arrangement being such that these sun wheels can in every case be brought into the necessary positions to obtain the four different speeds, by means of a rod 20 slidable in the bore of the axle 11. The sun wheel 32 belonging to the planet wheels 31 can be coupled either with clutch teeth 33 on the axle by corresponding clutch teeth provided in its bore (Fig. 1) or with a crown of teeth 34 on the planet-wheel carrier 29 (Figs. 3 to 5). The sun wheel 12 meshing with the planet wheels 5 either runs loose on the axle (Figs. 1 to 4) or can be coupled to the clutch teeth 33 (Fig. 5) by a corresponding clutch thereon formed. When the sun wheel 13 belonging to the planet wheels 6 is in its extreme right-hand position it can be coupled with the planet-wheel carrier by means of the crown of teeth 35 (Fig. 1), and made stationary when it is in its middle position by causing a row of teeth 36 on its outer end to engage with a crown of teeth 37 inside the stationary bearing cone 25 of the axle (Fig. 4), and when in its extreme left-hand position it can rotate loose on the axle (Fig. 5). In either of their positions the sun wheels remain in engagement with the corresponding planet wheels. For positioning the various sun wheels the draw rod 20 carries several stops and keys, the latter being slidable on it and controlled by springs. These keys project through longitudinal slots provided in the axle 11 and into circumferential grooves in the bores of the respective sun wheels, so as to produce a positive connection with them in the axial direction, while allowing the wheels freely to rotate. The sun wheel 32 is actuated by a key 38, the sun wheel 12 by a key 39 and the sun wheel 13 by a key 40. The keys 38 and 39 are continually pressed apart by a spring 41, their movement being limited by the ends of the respective slots in the axle, and the key 40 is continually pressed toward the right by a spring 42 abutting against a collar 43 on the draw rod 20. According to the particular arrangement of the rod 20 this spring 42 exerts pressure either against the right-hand end of the slot in the axle or against a shoulder of the said rod.

The planet gearing is adjusted for the various speeds as follows:—When, as in Fig. 1, the planet wheels 6 are coupled to their carrier 29 by means of the sun wheel 13 engaged with the teeth 35, while at the same time the sun wheel 32 is held fast on the axle by the clutch 33 introduced in the clutch teeth of this wheel, there can be no relative rotation of the driving member 8 and the planet-wheel carrier 29, the said driving member, the planet-wheel carrier 29, the sun wheel 13, the planet wheels 6, and their pivots rotating as a rigid whole, and consequently the planet wheels 31 now driven by the pivots 7 roll on the stationary wheel 32 and the wheel 30, and impart to the driven member 9 an increased velocity. When the gearing is connected in this manner the highest velocity is obtained. When the chain 22 attached to the draw rod 20 which enables the latter to be drawn to the right is released, the rod is moved to the left by means of the suitably disposed spring 21, whereupon the sun wheel 32 is likewise moved to the left by the key 38 and the spring 41 acting thereon coupling the planet wheels 31 with their carrier 29 by the engagement of the internal teeth 34. In this case (Fig. 3) none of the planet wheels on the pivots 7 can rotate about the latter, the gearing being locked throughout, and the driving member 8 and the driven member 9 consequently have the same speed. This is the normal speed. When the draw rod is released another step and takes up the position shown in Fig. 4, the change effected is that the sun wheel 13 no longer couples the planet wheels 6 with their carrier 29, but is itself coupled with the stationary cone 25 owing to its teeth 36 engaging in the internal teeth 37 of the cone 25 (Fig. 4). This sun wheel is now stationary and the planet wheels 6 roll thereon and also on the wheel 10 of the driving member, so that a slower speed is obtained, because force is transmitted from the driving member 8 to the driven member 9 by means of the operative planet gearing 6 and 13, the planet-wheel carrier 29 and the planet wheels 31 immovably coupled with it. When the rod 20 is in its extreme left-hand position (Fig. 5), the sun wheel 13 is uncoupled and free to rotate on the axle, whereas the sun wheel 12 which has previously always been revoluble on the axle 11 is now coupled thereto owing to its being moved to the left by the collar 43 and key 39 until the clutch teeth of said sun wheel 12 mesh with the teeth 33, as represented in Fig. 5. In this case the planet wheels 6 roll only on the wheel 10, while the planet wheels 5 roll on the stationary sun wheel 12; the lowest speed is thus obtained. The change in position of the various keys relative to the shoulders of the rod 20 and to the several slots in the axle is readily understood from the various figures.

In the modification of the planet gearing illustrated in Figs. 6 to 10 the wheel 10' meshes with the smaller planet wheels 5', which arrangement influences only the magnitude of the ratio of transmission, the principal parts being the same as formerly. The change-over device is, however, so arranged that the coupling up of the gearings is not effected by the sun wheels themselves and by axial displacement of same, but by special coupling sleeves. The coupling sleeve 50' which is under pressure of the spring 62' acting on the key 60' and tending to move it to the right, is employed for connecting the planet-wheel carrier 29' with the driven member 9'; a second sleeve 59' slidable on the axle 11' is used to connect the various sun wheels 32', 13', 12' either with one another or with the fixed cone 25'. For the latter purpose internal clutch teeth 51' and 52' are formed on the cone and outer clutch teeth 53', 54', 55' on the clutch sleeve (Fig. 8) to correspond with the internal teeth 56', 57', 58' in the bore of the sun wheels 12', 13' and 32' respectively. In the position shown in Fig. 8 the driven member 9' is coupled with the planet-wheel carrier 29' by means of the sleeve 50', the toothed rim of which engages in the internal toothing 34' of the carrier and in a like toothing 9" of the driven member 9°, while the sun wheels 32' and 12' are coupled with the sleeve 59' owing to the coupling teeth 58', 56' on these wheels engaging the teeth 55', 54' on the sleeve. Consequently, the gearing is completely locked and there is no change of speed when power is transmitted from the driving to the driven member. It now the rod 20' is moved toward the right by pulling on the chain 22' the teeth 51' engage the teeth 53'. The sleeve 59' thus being held stationary also fixes the sun wheel 13' owing to the engagement of teeth 55' with teeth 57' (Fig. 9). The planet wheels 5' now roll on the wheel 10' and the planet wheels 6' on the sun wheel 13', whereby a reduced speed is obtained. In the position shown in Fig. 10 which is the extreme right hand position of the sleeve 59' the sun wheel 12' is coupled with the cone 25' in a similar manner as stated before, consequently only the planet wheels 5' work rolling on the wheels 10' and 12', and the smallest speed is obtained. When the rod 20' is entirely released it is moved by the spring 21' to the extreme left, whereby the sleeve 59' positively but rotatably connected thereto by the keys 63' and 64', displaces the clutch sleeve 50' sufficiently far to set free the planet-wheel carrier 29' from the driven member 9' (Fig. 6). On the other hand, the sun wheels 32' and 13' being held not rotatable by the sleeve 59' coupled with the cone 25' by the teeth 52' and 53', the rotation of the various sets of planet wheels now brings about an increase of speed.

The drawings illustrate the planet gearing as applied to a bicycle hub with coaster brake, but such a gearing may be employed for other purposes, e. g. as a change-speed gearing for motor-cars, as an intermediate gearing for machine tools and in some cases as an addition to the change-gearing in screw-cutting lathes or the like. The gearing may also be reversed, that is to say the driving and driven members may be interchanged, the member 9 serving as the driving member and the member 8 as the driven member if it is desired to vary the speeds to be attained therewith.

The advantage of the great compactness of this variable speed gearing is obtained by mounting the various planet wheels on the same carrier which can be located between the driving and driven members. By means of the various sets of planet wheels the speed can be changed easily and step by step without the individual gear wheels coming entirely out of gear. In addition, an important feature is that it is possible to effect the necessary changes in the whole of the gearing by means of a single draw rod, the movement of which automatically brings about the coupling of the various planet systems.

The invention resides in the essential features disclosed hereinbefore, which are capable of being embodied in different ways.

What I, therefore, claim as my invention, and desire to secure by Letters Patent, is:—

1. The combination with a plurality of sets of planet wheels, some of which are rigidly connected with one another, and separate sun-wheels, of a common carrier for all the planet wheels, driving and driven members meshing with the planet wheels of different sets, and means for coupling the sun-wheels with one another or with other parts, whereby the several wheels are prevented from rotating relatively to one another or one of the sun-wheels is held stationary.

2. The combination with a plurality of sets of planet wheels, some of which are rigidly connected with one another, and separate sun-wheels, of a common carrier for all the planet wheels, driving and driven members meshing with the planet wheels of different sets, means for coupling the sun-wheels with one another or with other parts, whereby the several wheels are prevented from rotating relatively to one another or one of the sun-wheels is held stationary, and a shifting device adapted to control said coupling means.

3. The combination with a plurality of sets of planet wheels, some of which are rigidly connected with one another, and separate sun-wheels, of a common carrier for all the planet wheels, driving and driven members meshing with the planet wheels of different sets, and means for rigidly connecting all the gear wheels.

4. The combination with three sets of planet wheels, two of which are rigidly connected with one another, and separate sun-wheels, of a rotatable carrier on which all the planet wheels are mounted, driving and driven members meshing with the planet wheels of different sets, and means for coupling the sun-wheels with one another or with other parts for the purposes specified.

5. The combination with three sets of planet wheels, two of which are rigidly connected with one another, and separate sun wheels, of a rotatable carrier on which all the planet wheels are mounted, driving and driven members meshing with the planet wheels of different sets, means for coupling the sun-wheels with one another or with other parts for the purposes specified, and an axially movable shifting device adapted to control said coupling means.

6. The combination with a plurality of sets of planet wheels, some of which are rigidly connected with one another, and separate sun-wheels, of a common carrier for all the planet wheels, driving and driven members meshing with the planet wheels of different sets, means for coupling the sun-wheels with one another or with other parts, whereby the several wheels are prevented from rotating relatively to one another or one of the sun-wheels is held stationary, a shifting device adapted to control said coupling means, and resilient connecting means on said shifting device, whereby the latter has independent control of the separate sun-wheels.

7. The combination with driving and driven members having internal teeth, of a planet wheel carrier located and supported to rotate freely between said members, three sets of planet wheels mounted in said carrier, and sun-wheels corresponding to the planet wheels, two of the sets of planet wheels being rigidly connected to one another, means adapted to couple the sun wheels with stationary or rotary parts, and a shifting device yieldingly connected to said coupling means whereby the several sun wheels are controlled independently of one another.

8. In a planet gearing the combination with three sets of planet wheels separate and axially displaceable sun-wheels, of driving and driven members meshing with certain of the sets of planet wheels, couplings adapted to fix the sun-wheels stationary or to rotating parts, means capable of shifting said sun-wheels, and yielding connecting means allowing individual control of the different sets of planet gearing.

9. The combination with three sets of planet wheels, two sets of which are rigidly connected, and sun-wheels axially displaceable with respect to said planet wheels, of a planet wheel carrier, clutches provided on said carrier and on the sun wheels, stationary coupling means adapted to engage with the clutches of the sun-wheels, and means for axially shifting the sun-wheels individually for engaging the respective clutches and controlling the different sets of planet wheels.

10. The combination with three sets of planet wheels, two sets of which are rigidly connected, and sun-wheels axially displaceable with respect to said planet wheels, of a planet wheel carrier, clutches provided on said carrier and on the sun-wheels, stationary coupling means adapted to engage with the clutches of the sun-wheels, means for axially shifting the sun-wheels for engaging the respective clutches, shoulders and yielding means on said shifting device adapted to control the various sun-wheels individually, and stationary stops for limiting the movement of the sun-wheels and their shifting means.

In testimony whereof I signed my name to this specification in the presence of two subscribing witnesses.

FRANZ WINKLER.

Witnesses:
 JEAN GRUND,
 CARL GRUND.